US012024038B2

(12) United States Patent
Sakakibara (10) Patent No.: US 12,024,038 B2
(45) Date of Patent: Jul. 2, 2024

(54) PARKING AID SYSTEM (71) Applicant: HONDA MOTOR CO., LTD., Tokyo (JP)

(72) Inventor: Naoya Sakakibara, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 570 days.

(21) Appl. No.: 17/202,355

(22) Filed: Mar. 16, 2021

(65) Prior Publication Data
US 2021/0291681 A1 Sep. 23, 2021

(30) Foreign Application Priority Data

Mar. 18, 2020 (JP) .................................. 2020-047089

(51) Int. Cl.
*B60L 53/36* (2019.01)
*B60L 53/12* (2019.01)
*B60L 53/30* (2019.01)
*B60L 53/65* (2019.01)
*B62D 15/02* (2006.01)

(52) U.S. Cl.
CPC ............... *B60L 53/36* (2019.02); *B60L 53/12* (2019.02); *B60L 53/305* (2019.02); *B60L 53/65* (2019.02); *B62D 15/027* (2013.01); *B62D 15/0285* (2013.01)

(58) Field of Classification Search
None
See application file for complete search history.

(56) References Cited

U.S. PATENT DOCUMENTS

| 9,302,594 B2* | 4/2016 | Tripathi | B60L 53/65 |
| 10,320,245 B2* | 6/2019 | Sieber | B60L 53/66 |
| 11,332,125 B2* | 5/2022 | Sakai | B60K 35/00 |
| 2015/0165923 A1 | 6/2015 | Hirayama et al. | |

(Continued)

FOREIGN PATENT DOCUMENTS

| CN | 105189189 A | 12/2015 |
| CN | 105377621 A | 3/2016 |
| EP | 3608189 A1 | 2/2020 |

(Continued)

OTHER PUBLICATIONS

Office Action issued in the CN Patent Application No. CN202110289298.2, mailed on Sep. 26, 2023.

*Primary Examiner* — Todd Melton
(74) *Attorney, Agent, or Firm* — CKC & Partners Co., LLC (57) ABSTRACT

A parking aid system 1 includes: a plurality of power supply devices installed at every parking space, and a parking aid device 5 which is built into a vehicle 2. The parking aid device 5 includes an on-board communication device 21 which acquires a first positional information sent from a power supply device, and an alignment aid unit 23 which aids in alignment to a power supply unit of the power supply device based on the first positional information. The alignment aid unit 23 calculates a path of the vehicle 2, specifies a power supply unit on the path of the vehicle 2 from among the power supply units of the plurality of power supply devices based on the first positional information, and executes authentication which permits transmission of electrical power with the power supply device of this specified power supply unit.

6 Claims, 4 Drawing Sheets (56) References Cited

U.S. PATENT DOCUMENTS

2015/0375631 A1   12/2015   Ueda

FOREIGN PATENT DOCUMENTS

| JP | 5849876 | B2 | 2/2016 |
| JP | 5910315 | B2 | 4/2016 |
| JP | 2016533150 | A | 10/2016 |
| WO | 2015009482 | A2 | 1/2015 |

* cited by examiner

PARKING AID SYSTEM

This application is based on and claims the benefit of priority from Japanese Patent Application No. 2020-047089, filed on 18 Mar. 2020, the content of which is incorporated herein by reference.

BACKGROUND OF THE INVENTION

Field of the Invention

The present invention relates to a parking aid system. In more detail, it relates to a parking aid system which aids in parking of a vehicle to a parking space in which a power supply device that sends electrical power by non-contact power supply is provided.

Related Art

Conventionally, various devices have been proposed for charging by non-contact power supply to an electric vehicle. Patent Document 1 discloses a configuration which searches for a power supply device capable of charging by wireless communication with power supply devices, and accepts a selection by a driver, then pairs (authenticates). In addition, Patent Document 2 discloses a configuration which refines the search for power supply devices capable of charging and then pairs, by gradually decreasing the power of the wireless communication and detecting responses, in the wireless communication with power supply devices.

Patent Document 1: Japanese Patent No. 5910315
Patent Document 2: Japanese Patent No. 5849876

SUMMARY OF THE INVENTION

However, in the case of a plurality of parking spaces being provided side by side, the selection operation of a parking position by the driver is complicated with the technology shown in Patent Document 1. In addition, according to the technology shown in Patent Document 2, since connection is established automatically by simply bringing the vehicle close to the parking space, it is possible to improve the usability. However, in the case of a plurality of parking spaces being provided side by side, there are cases where it becomes difficult for the driver to correctly identify with which parking space the connection is being established. For this reason, the driver may no longer be able to understand in which parking space the vehicle should be parked.

The present invention has an object of providing a parking aid system which can use a parking space capable of simply and reliably charging, even in a case of a plurality of parking spaces being provided side by side.

A parking aid system according to a first aspect of the present invention include: a plurality of power supply devices installed in every parking space and sending electrical power for power supply non-contact; and a parking aid device which is equipped to a vehicle that charges a battery and travels by the electrical power for power supply, and aids in parking to the parking space; in which the power supply device sends, by way of wireless communication, first positional information of a power supply unit that sends the electrical power for power supply; in which the parking aid device includes: a positional information acquisition unit which acquires the first positional information sent from the power supply device; and an alignment aid unit which aids in alignment to the power supply unit of the power supply device based on the first positional information; in which the alignment aid unit calculates a path of the vehicle from current positional information of the vehicle and information of a steering angle of the vehicle, and specifies a power supply unit on the path of the vehicle from among power supply units of the plurality of power supply devices based on the first positional information, and executes authentication processing which permits transmission of the electrical power with the power supply device of the power supply unit thereby specified.

According to a second aspect of the present invention, in this case, it is preferable for the power supply device to send, by way of the wireless communication, second positional information according to a relative position of the vehicle with the power supply unit based on a magnetic signal emitted from the vehicle; the positional information acquisition unit to acquire the first positional information and the second positional information; and the alignment aid unit specifies a power supply device executing the authentication processing based on the first positional information and the second positional information.

According to a third aspect of the present invention, in this case, it is preferable for the alignment aid unit to specify a power supply unit on the path based on the second positional information, after specifying a power supply unit on the path based on the first positional information, and in a case of the power supply unit specified based on the first positional information and the power supply unit specified based on the second positional information differing, execute the authentication processing with the power supply device of the power supply unit specified on the second positional information.

According to a fourth aspect of the present invention, in this case, it is preferable for the alignment aid unit to display, on a display unit equipped to the vehicle, information related to relative position between a power receiving unit which receives the electrical power for power supply and the power supply unit of the power supply device executing the authentication processing.

In the parking aid system according to the first aspect of the present invention, the parking aid device equipped to the vehicle includes: the positional information acquisition unit which acquires the first positional information sent from the power supply device installed at every parking space; and the alignment aid unit which aids in the alignment of the vehicle to the power supply unit of the power supply device based on this first positional information. The alignment aid unit calculates the path of the vehicle based on the current positional information of the vehicle and information of the steering angle, and specifies a power supply unit on the path of the vehicle from among the power supply units of the plurality of power supply devices based on the first positional information, and executes authentication processing which permits transfer of electrical power with the power supply device of this specified power supply unit. Even in the case of a plurality of parking spaces being provided side by side, it is thereby possible to execute authentication processing with the power supply device installed in a targeted parking space, by the driver simply moving the vehicle to the targeted parking space. Even in the case of the plurality of parking spaces being provided side by side, it is thereby possible to use a parking space capable of easily and reliably charging.

In the parking aid system according to the second aspect of the present invention, the power supply device sends the second positional information according to the relative position of the vehicle with the power supply unit based on magnetic signals emitted from the vehicle by wireless communication, and the alignment aid unit specifies the power supply device executing authentication processing based on the first positional information and the second positional information. Since it is thereby possible to accurately specify a power supply unit on the path, a parking space capable of charging more reliably can be used.

According to the third aspect, in the case of the plurality of parking spaces being provided side by side, displacement may arise between the parking space in which the power supply unit specified based on the first positional information is provided and the parking space actually targeted by the driver. To address this, in the parking aid system according to the present invention, after specifying the power supply unit on the path based on the first positional information, the alignment aid unit specifies the power supply unit on the path based on the second positional information. In addition, the alignment aid unit, in the case of the power supply unit specified based on the first positional information and the power supply unit specified based on the second positional information differing, executes the authentication processing with the power supply device of the power supply unit specified based on the second positional information acquired after the first positional information. Since it is thereby possible to execute authentication processing with the power supply device provided to the parking space targeted by the driver, it is possible to use the parking space targeted by the driver more reliably.

In the parking aid system according to the fourth aspect of the present invention, the alignment aid unit displays, on the display unit equipped to the vehicle, information related to the relative position between the power receiving unit which receives the electrical power for power supply and the power supply unit of the power supply device executing authentication processing. Since the driver can thereby easily specify the power supply device on which the authentication processing was executed, even in the case of a plurality of parking spaces being provided side by side, the convenience can be further improved.

DETAILED DESCRIPTION OF THE INVENTION

Hereinafter, a parking aid system according to an embodiment of the present invention will be explained while referencing the drawings.

Figure 1:
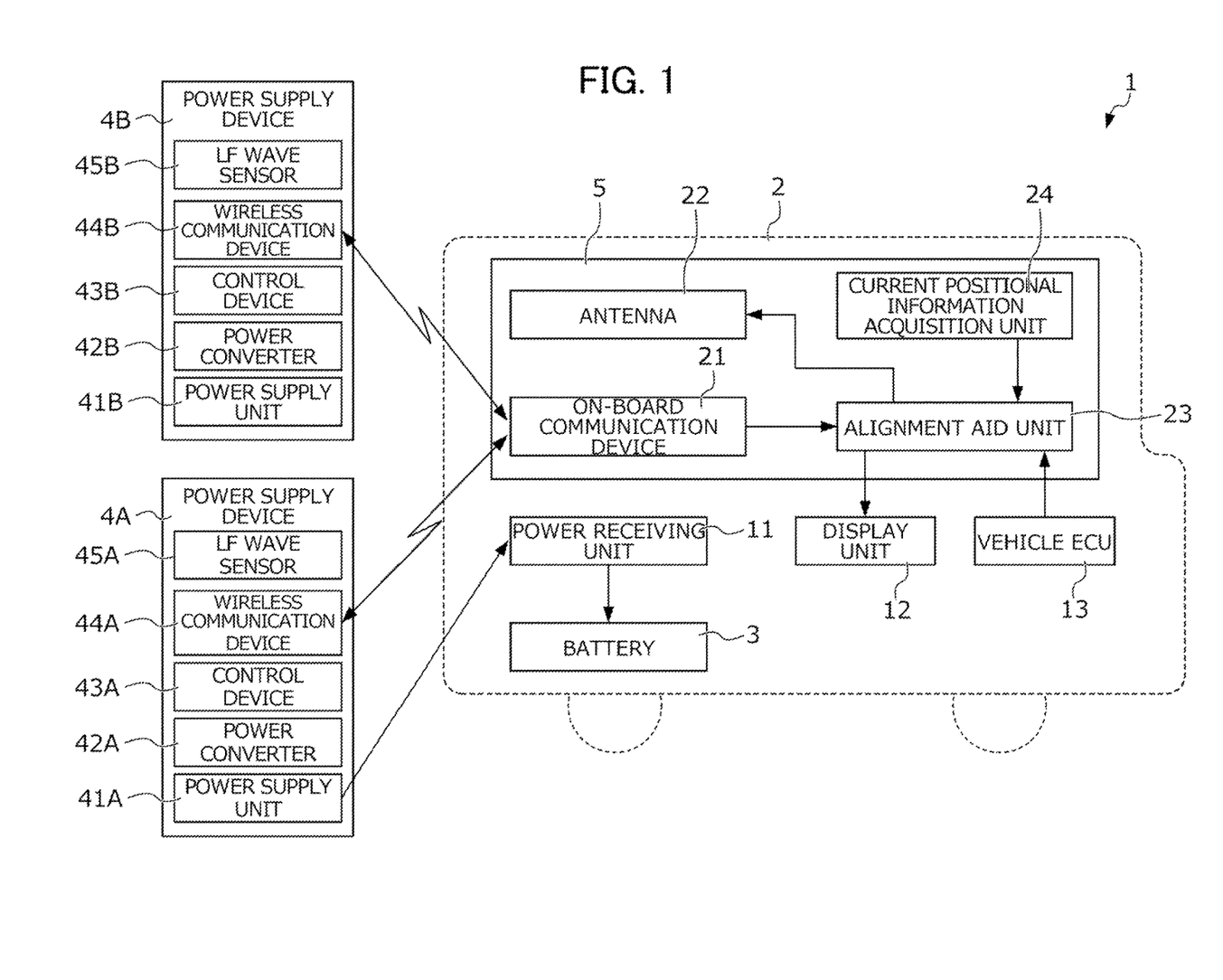
FIG. 1 is a block diagram showing a parking aid system according to an embodiment of the present invention.

FIG. 1 is a block diagram showing a parking aid system 1 according to the embodiment. The parking aid system 1 aids in parking of a vehicle 2 to a parking space capable of power supply by non-contact power supply.

The vehicle 2 is an electric vehicle which travels by way of power of a chargeable/dischargeable battery 3. The battery 3 can widely apply secondary batteries, capacitors, etc. capable of charging/discharging electrical power by which the vehicle 2 can travel, such as a lithium-ion secondary battery or nickel hydride secondary battery. A plurality of parking spaces are provided to be side by side (two in the example of FIG. 1). To each parking space, power supply devices 4A, 4B that supply electrical power for charging of the battery 3 are respectively provided.

The parking aid system 1 includes the power supply devices 4A, 4B provided to each parking space, and the vehicle 2 equipped with a parking aid device 5 described later.

The power supply device 4A includes: a power supply unit 41A including a power supply coil which sends electrical power; a power converter 42A which converts alternating current power (not shown) into direct current power and supplies to the power supply unit 41A; a control device 43A which operates the power converter 42A and sends charging power of the battery 3 from the power supply 41A; a wireless communication device 44A which performs wireless communication with an on-board communication device 21 equipped to the vehicle 2; and a plurality of LF (Low Frequency) wave sensors 45A provided in the vicinity of the power supply unit 41A.

The power supply unit 41A is installed in the road surface of the parking space. More specifically, the power supply unit 41A is provided at a position facing and close to a power receiving coil provided to the vehicle 2 parked in the parking space. The control device 43A operates the power converter 42A in response to the vehicle 2 paired with the power supply unit 41A through authentication processing described later using the wireless communication device 44A having been alignment parked in the parking space, and causes the charging power of the battery 3 to be sent from the power supply unit 41A. Herein, alignment parking refers to stopping the vehicle 2 within the parking space so that a power receiving unit 11 provided to the vehicle 2 faces the power supply unit 41A.

Figure 2:
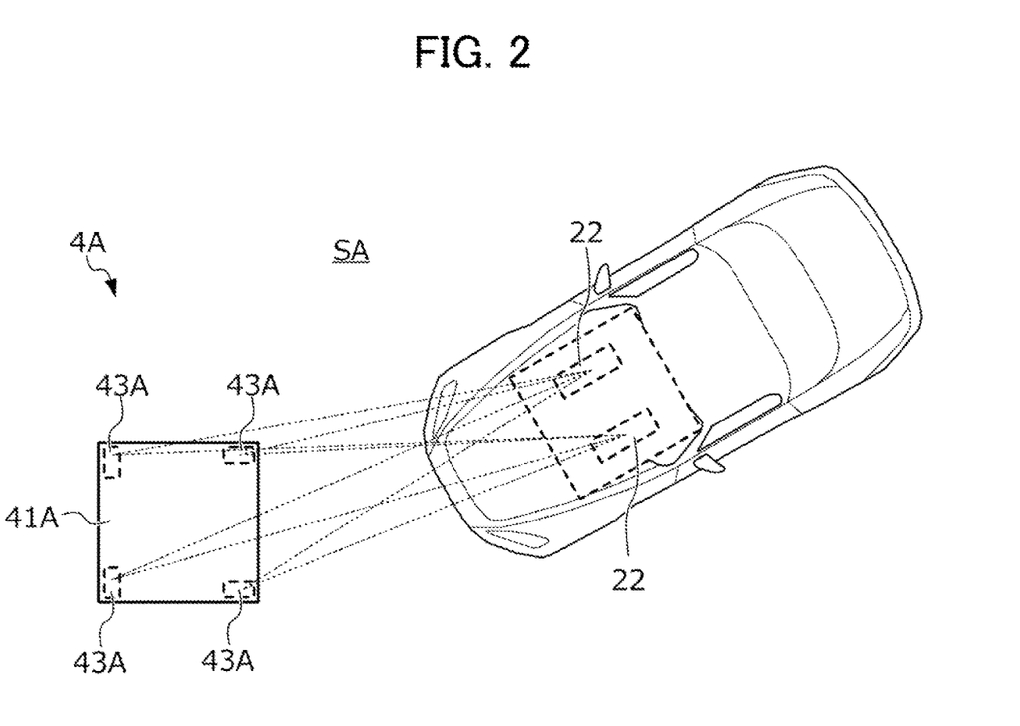
FIG. 2 is a plan view of a parking space to which a power supply device is provided.

FIG. 2 is a plan view of a parking space SA at which a power supply device 4A is installed. As shown in FIG. 2, the power supply unit 41 is a rectangular shape in a plan view. Four of the LF wave sensors 45 are provided, each to the four corners of this power supply unit 41A. Each LF wave sensor 45A detects long-wave magnetic signals emitted from a plurality of antennas 22 described later equipped to the vehicle 2, and sends a detection signal to the wireless communication device 44A. The relative positions of the power supply unit 41A and the power receiving unit 11 equipped to the vehicle 2 can be calculated based on the detection signals of this plurality of LF wave sensors 45A.

Referring back to FIG. 1, the wireless communication device 44A performs data communication between with on-board communication devices 21 existing within a wireless communication range in the vicinity thereof, by Wi-Fi (registered trademark), for example. The wireless communication device 44A sends at predetermined cycles a beacon including positional information of the power supply unit 41A, prior to executing authentication processing with a specific on-board communication device 21. Herein, positional information of power supply unit 41A is the positional information from GPS (Global Positioning System), for example, and is also referred to as first positional information hereinafter. Therefore, on the side of the vehicle 2, it is possible to grasp the position of the power supply unit 41A based on the beacon sent from the wireless communication device 44A.

In addition, the wireless communication device 44A sends, to the on-board communication device 21, a detection signal of the plurality of LF wave sensors 45A described above, after data communication becomes possible through authentication processing. The relative positions of the power supply unit 41A and the power receiving unit 11 equipped to the vehicle 2 can be calculated based on the detection signals of the plurality of LF wave sensors 45A, as mentioned above. Therefore, the detection signals of the plurality of LF wave sensors 45A sent by the data communication from the wireless communication device 44A to the on-board communication 21 is also referred to as second positional information.

The power supply device 4B includes: a power supply unit 41B of the same configuration as the power supply unit 41A of the power supply device 4A; a power converter 42B of the same configuration as the power converter 42A the power supply device 4A; a control device 43B of the same configuration as the control device 43A of the power supply device 4A; a wireless communication device 44B of the same configuration as the wireless communication device 44A of the power supply device 4A; and LF wave sensors 45B of the same configuration as the LF wave sensors 45A of the power supply device 4A.

The vehicle 2 includes the battery 3, a parking aid device 5, a power receiving unit 11, a display unit 12, and a vehicle ECU 13 which is an on-board computer.

The power receiving unit 11 charges the battery 3 by receiving electrical power sent from the power supply unit 41A of the power supply device 4A or the power supply unit 41B of the power supply device 4B by non-contact. Herein, in the charging method and charge/discharge control of the battery 3, it is possible to widely adopt various configurations applicable to this type of vehicle 2. The power receiving unit 11 includes a power receiving coil corresponding to the power supply coil of the power supply units 41A, 41B, a rectifier circuit which rectifies the output from this power receiving coil, a charge/discharge control circuit of the battery 3, etc.

The display unit 12 is a display presenting various information by image display to the driver and other passengers. As the display unit 12, an image display panel such as a liquid crystal display panel and organic EL panel, a heads-up display or the like can be used. Hereinafter, a case of using a display of a car navigation device as the display unit 12 will be explained; however, the present invention is not to be limited thereto.

The vehicle ECU 13 is a controller which presides over control of the vehicle 2. The vehicle ECU 13 outputs, to the parking aid device 5, various information required in the processing of the parking aid device 5 such as information of the steering angle of the vehicle 2.

The parking aid device 5 includes the on-board communication device 21, a plurality of antennas 22, alignment aid unit 23 and current positional information acquisition unit 24, and by using these, aids in the parking of the vehicle 2 to the parking space to which the power supply devices 4A, 4B are installed.

The on-board communication device 21 performs data communication with the wireless communication devices 44A, 44B existing within the wireless communication range in the vicinity thereof, by Wi-Fi (registered trademark), for example. The on-board communication device 21 determines the presence/absence of the wireless communication devices 44A, 44B within the wireless communication range, by scanning a predetermined frequency band at predetermined cycles. The on-board communication device 21 acquires the first positional information based on the beacons sent from the wireless communication devices 44A, 44B, and sends this first positional information to the alignment aid unit 23. In addition, the on-board communication device 21 acquires the second positional information based on data communication with the wireless communication devices 44A, 44B, and sends this second positional information to the alignment aid unit 23.

The plurality of antennas 22 emit long-wave magnetic signals based on a command from the alignment aid unit 23.

The current positional information acquisition unit 24 acquires the current positional information of the vehicle 2, and sends to the alignment aid unit 23. Herein, although it is possible to adopt various configurations in the acquisition of the current positional information, the present embodiment explains a case of acquiring the current positional information by GPS.

Figure 3:
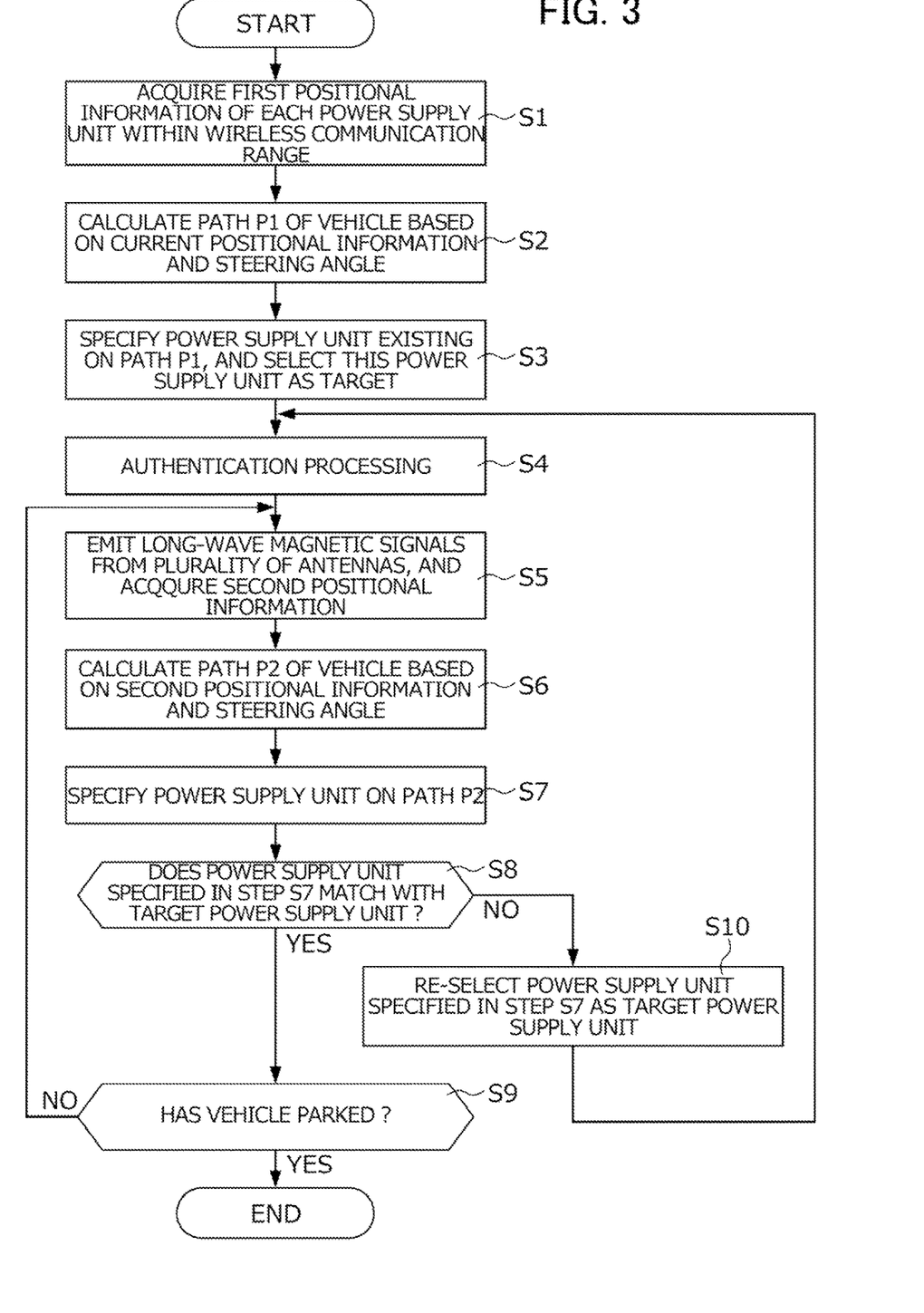
FIG. 3 is a flowchart showing a specific sequence of alignment parking processing by an alignment aid unit.

The alignment aid unit 23 aids alignment parking of the vehicle 2 in a parking space capable of charging to the battery 3, by executing the alignment parking processing explained by referencing FIG. 3, based on information of the steering angle sent from the vehicle ECU 13, the current positional information sent from the current positional information acquisition unit 24, and the first positional information and second positional information sent from the on-board communication device 21.

FIG. 3 is a flowchart showing a specific sequence of alignment parking processing by the alignment aid unit 23. The processing shown in FIG. 3 starts in response to being determined that wireless communication devices of at least two of the plurality of power supply devices are present within wireless communication range of the on-board communication device 21.

Figure 4:
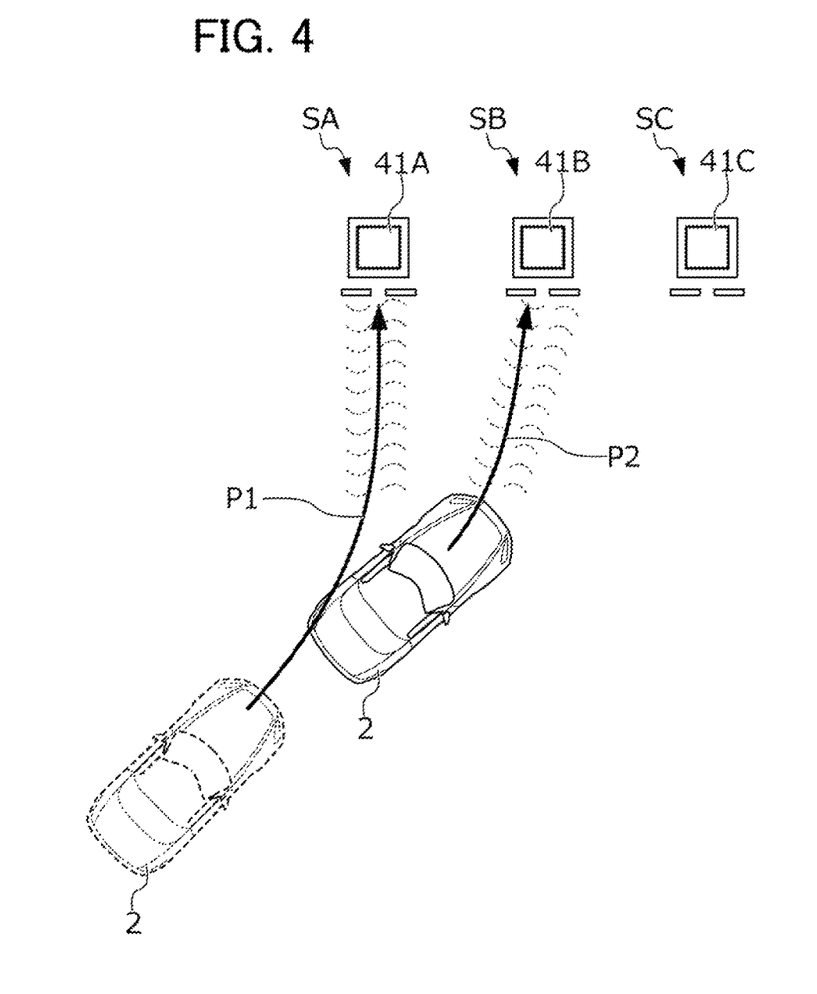
FIG. 4 is a plan view of a parking lot in which a plurality of parking spaces is provided.

FIG. 4 is a plan view of a parking lot in which a plurality of parking spaces is provided. FIG. 4 shows a parking lot in which the three parking spaces SA, SB, SC are provided side by side. In each parking space SA, SB, SC, the power supply units 41A, 41B, 41C are respectively provided. In addition, FIG. 4 shows the vehicle 2 at the time when the wireless communication device provided to each parking space SA, SB, SC enters within the wireless communication range of the on-board communication device 21, i.e. moment when starting alignment parking processing shown in FIG. 3, by a dashed line, and shows the vehicle 2 after this predetermined time by a solid line. Hereinafter, a specific sequence of alignment parking processing in FIG. 3 will be explained while referencing the example of FIG. 4.

First, in step S1, the alignment aid unit 23 acquires the first positional information of each power supply unit existing within the wireless communication range, based on the beacon sent from each wireless communication device existing within the wireless communication range. Herein, information related to the longitude and latitude of each power supply unit is included in the first positional information.

In step S2, the alignment aid unit 23 calculates a path P1 of the vehicle 2 (refer to FIG. 4), based on the current positional information of the vehicle 2 sent from the current positional information acquisition unit 24 and information of the steering angle sent from the vehicle ECU 13.

In step S3, the alignment aid unit 23 specifies the power supply unit existing on the path P1 of the vehicle 2 from among the plurality of power supply units, by comparing the paths P1 of the vehicle 2 calculated in step S2 with the first positional information of each power supply unit acquired in step S1, and then selects this power supply unit as a target power supply unit. In the example of FIG. 4, the power supply unit 41A provided to the parking space SA which is the most to the left side is selected as the target power supply unit.

In step S4, the alignment aid unit 23 executes authentication processing by transmitting an authentication packet between the on-board communication device 21 and the wireless communication device of the power supply device including the selected target power supply unit. It thereby becomes possible to perform data communication between the vehicle 2 and the power supply device including the target power supply unit. In addition, in step S4, the alignment aid unit 23 causes the information related to the relative position of the target power supply unit of the power supply device executing authentication processing to be displayed on the display unit 12.

In step S5, the alignment aid unit 23 acquires the second positional information via data communication between the on-board communication device 21 and the wireless communication device of the power supply device, after emitting long-wave magnetic signals from the plurality of antennas 22.

In Step S6, the alignment aid unit 23 calculates again a path P2 of the vehicle 2 (refer to FIG. 4), based on the second positional information acquired in step S5, and the information of the steering angle sent from the vehicle ECU 12. In the aforementioned way, the second positional information is configured by detection signals of a plurality of LF wave sensors when emitting magnetic signals from the plurality of antennas 22 existing within the wireless communication range. For this reason, in the alignment aid unit 23, by using the second positional information, it is possible to estimate the current position of the vehicle 2 with higher precision than a case of using the current positional information sent from the current positional information acquisition unit 24. For this reason, the path P2 calculated based on the second positional information in step S6 has higher precision than the path P1 calculated in step S2.

In step S7, the alignment aid unit 23 specifies a power supply unit existing on the path P2, by comparing between the first positional information of each power supply unit acquired in step S1 and the path P2 of the vehicle 2 calculated again in step S6. In the example shown in FIG. 4, the power supply unit 41B provided to the parking space SB next to the parking space SA is specified as the power supply unit existing on the path P2.

In step S8, the alignment aid unit 23 determines whether or not the target power supply unit selected based on the first positional information in step S3 and the power supply unit specified based on the second positional information in step S7 are matching. The alignment aid unit 23 advances to step S9 in a case of the determination result of step S8 being YES, and advances to step S10 in a case of being NO.

In step S9, the alignment aid unit 23 determines whether or not the vehicle 2 was parked. Herein, whether or not the vehicle 2 was parked can be determined according to whether or not the vehicle speed is 0 and the shift position is the park position. The alignment aid unit 23 ends the processing shown in FIG. 3, in a case of the determination result of step S9 being YES. Charging of the battery 3 thereby starts by the electrical power sent from the power supply unit. In addition, the alignment aid unit 23 advances to step S5, in a case of the determination result of step S9 being NO.

In the case of the determination result of step S8 being NO, i.e. case of the target power supply unit selected based on the first positional information and the power supply unit specified based on the second positional information not matching, the alignment aid unit 23 advances to step S10. In step S10, the alignment aid unit 23 advances to step S4, after selecting again the power supply unit specified based on the second positional information in step S7 as the target power supply unit. In the example of FIG. 4, the power supply unit 41B provided in the parking space SB is selected again as the target power supply unit. In step S4, the alignment aid unit 23 executes re-authentication processing, by transmitting an authentication packet between the on-board communication device 21 and the wireless communication device of the power supply device including the power supply unit specified based on the second positional information.

In the above way, the alignment aid unit 23 specifies the power supply device executing authentication processing based on the first positional information and the second positional information. More specifically, the alignment aid unit 23, after first specifying a power supply unit on the path P1 of the vehicle 2 based on the first positional information, subsequently respecifies a power supply unit on the path P2 of the vehicle 2 based on the second positional information, and in the case of the power supply unit specified based on the first positional information and the power supply unit specified based on the second positional information differing, selects the power supply unit specified based on the second positional information having higher precision as the target power supply unit, and executes authentication processing with this target power supply unit.

According to the parking aid system 1 of the present embodiment, the following effects are exerted.

(1) The parking aid device 5 equipped to the vehicle 2 includes: the on-board communication device 21 which acquires the first positional information sent from the power supply device installed at every parking space; and the alignment aid unit 23 which aids in the alignment of the vehicle to the power supply unit of the power supply device based on this first positional information. The alignment aid unit 23 calculates the path P1 of the vehicle 2 based on the current positional information of the vehicle and information of the steering angle, and specifies a power supply unit on the path P1 of the vehicle 2 from among the power supply units of the plurality of the power supply devices based on the first positional information, and executes authentication processing which permits transfer of electrical power with the power supply device of this specified power supply unit. Even in the case of a plurality of parking spaces being provided side by side, it is thereby possible to execute authentication processing with the power supply device installed in a targeted parking space, by the driver simply moving the vehicle to the targeted parking space. Even in the case of the plurality of parking spaces being provided side by side, it is thereby possible to use a parking space capable of easily and reliably charging.

(2) The power supply device sends the second positional information according to the relative position of the vehicle with the power supply unit based on magnetic signals emitted from the vehicle by wireless communication, and the alignment aid unit 23 specifies the power supply device executing authentication processing based on the first positional information and the second positional information. Since it is thereby possible to accurately specify a power supply unit on the path of the vehicle 2, a parking space capable of charging more reliably can be used.

(3) In the case of the plurality of parking spaces being provided side by side, displacement may arise between the parking space in which the power supply unit specified based on the first positional information is provided and the parking space actually targeted by the driver. To address this, after specifying the power supply unit on the path P1 based on the first positional information, the alignment aid unit 23 specifies the power supply unit on the path P2 based on the second positional information. In addition, the alignment aid unit 23, in the case of the power supply unit specified based on the first positional information and the power supply unit specified based on the second positional information differing, executes the authentication processing with the power supply device of the power supply unit specified based on the second positional information acquired after the first positional information. Since it is thereby possible to execute authentication processing with the power supply device provided to the parking space targeted by the driver, it is possible to use the parking space targeted by the driver more reliably.

(4) The alignment aid unit 23 displays, on the display unit 12 equipped to the vehicle 2, information related to the relative position between the power receiving unit which receives the electrical power for power supply and the power supply unit of the power supply device executing authentication processing. Since the driver can thereby easily specify the power supply device on which the authentication processing was executed, even in the case of plurality of parking spaces being provided side by side, the convenience can be further improved.

Although an embodiment of the present invention has been explained above, the present invention is not to be limited thereto. The configuration of detailed parts may be appropriately modified within a scope of the gist of the present invention.

What is claimed is:

1. A parking aid system comprising: a plurality of power supplies installed in every parking space and sending electrical power for power supply by non-contact; and
a parking aid device which is equipped to a vehicle that charges a battery and travels by the electrical power for power supply, and aids in parking to the parking space,
wherein the power supply sends, by way of wireless communication, first positional information of a power supply coil that sends the electrical power for power supply,
wherein the parking aid device includes:
a positional information acquisition unit which acquires the first positional information sent from the power supply; and
an alignment aid unit which aids in alignment to the power supply coil of the power supply based on the first positional information,
wherein the alignment aid unit
calculates a future path of the vehicle as a first future path from current positional information of the vehicle and information of a steering angle of the vehicle,
specifies a power supply coil existing on the first future path from among power supply coils of the plurality of power supplies based on a comparison of the first positional information and the first future path, and executes authentication processing which permits transmission of the electrical power with the power supply of the power supply coil thereby specified.

2. The parking aid system according to claim 1, wherein the power supply, after executing the authentication processing, acquires a relative position of the vehicle with the power supply coil based on a magnetic signal emitted from the vehicle, and sends second positional information according the relative position by way of the wireless communication,
wherein the positional information acquisition unit further acquires the second positional information after executing the authentication processing, and
wherein the alignment aid unit specifies a power supply to execute the authentication processing again based on the first positional information and the second positional information.

3. The parking aid system according to claim 2, wherein the alignment aid unit, after specifying a power supply coil existing on the first future path based on a comparison of the first positional information and the first future path, calculates a future path of the vehicle as a second future path based on the second positional information and information of the steering angle, specifies a power supply coil existing on the second future path, and in a case of the power supply coil existing on the first future path and the power supply coil existing on the second future path differing, executes the authentication processing again with the power supply of the power supply coil existing on the second future path.

4. The parking aid system according to claim 3, wherein the alignment aid unit displays, on a display unit equipped to the vehicle, information related to relative position between a power receiving unit which receives the electrical power for power supply and the power supply coil of the power supply executing the authentication processing.

5. The parking aid system according to claim 2, wherein the alignment aid unit displays, on a display unit equipped to the vehicle, information related to relative position between a power receiving unit which receives the electrical power for power supply and the power supply coil of the power supply executing the authentication processing.

6. The parking aid system according to claim 1, wherein the alignment aid unit displays, on a display unit equipped to the vehicle, information related to relative position between a power receiving unit which receives the electrical power for power supply and the power supply coil of the power supply executing the authentication processing.

* * * * *